Nov. 9, 1965  A. FERRANTI  3,217,195
ELECTRIC MOTOR WITH CLUTCH AND BRAKE
Filed April 18, 1962  2 Sheets-Sheet 1

Nov. 9, 1965 A. FERRANTI 3,217,195
ELECTRIC MOTOR WITH CLUTCH AND BRAKE
Filed April 18, 1962 2 Sheets-Sheet 2

United States Patent Office 3,217,195
Patented Nov. 9, 1965

3,217,195
ELECTRIC MOTOR WITH CLUTCH AND BRAKE
Albino Ferranti, Viale Marche 97, Milan, Italy
Filed Apr. 18, 1962, Ser. No. 188,500
Claims priority, application Italy, Apr. 21, 1961, 12,468
9 Claims. (Cl. 310—76)

This invention relates to an electric motor combined with clutch and brake for operating, periodically machine, tools, such as shears, presses, cutters and the like, in which on one hand considerable torques are required, and on the other the machine have to be quickly stopped.

Such machines usually include, between the operating motor and the driven part, clutch members which are directly operated by the user. These clutch members require a certain effort to operate they are complicated, and they are not satisfactory for operating machines of high power that are started and stopped in quick succession.

The invention solves the problem of controlling quick and sure successive engagement and release between the operating motor and the driven part of the machine in such a way that the latter is stopped in the proper position.

The electric motor with clutch and brake according to the invention comprises a rotor having on one of its two ends a disc axially movable and torsionally fixed to a shaft operating a machine tool. The disc is alternately pressed against two opposed surfaces, formed the one on the said rotor and the other on the motor casing. The disc is combined with a counter-disc rotated by a servo-motor and engageable with circumferentially arranged wedge-shaped means (inclined planes or cams) so interposed between said counter-disc and the motor casing that, when said counter-disc is rotated by the servomotor the disc is caused to axially translate to alternately engage and disengage the two opposed surfaces.

The counter-disc carries rollers disposed with their axes in a radial direction and axially movable relative to said counter-disc and co-operating, by means of the inclined planes, with the motor casing and a flange fixed to the disc. When the counter-disc is rotated, its rollers, co-operating with the inclined planes, cause said disc to axially translate.

Figure 1:
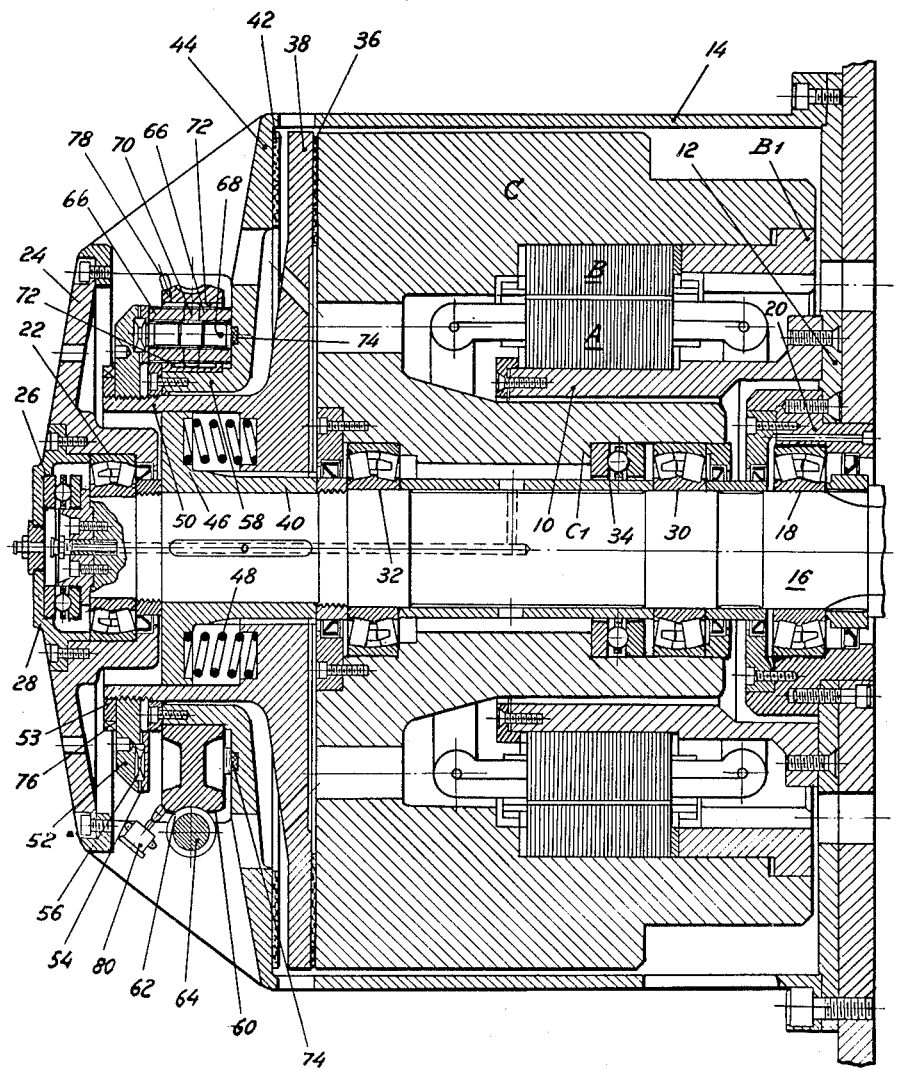
Figure 2:
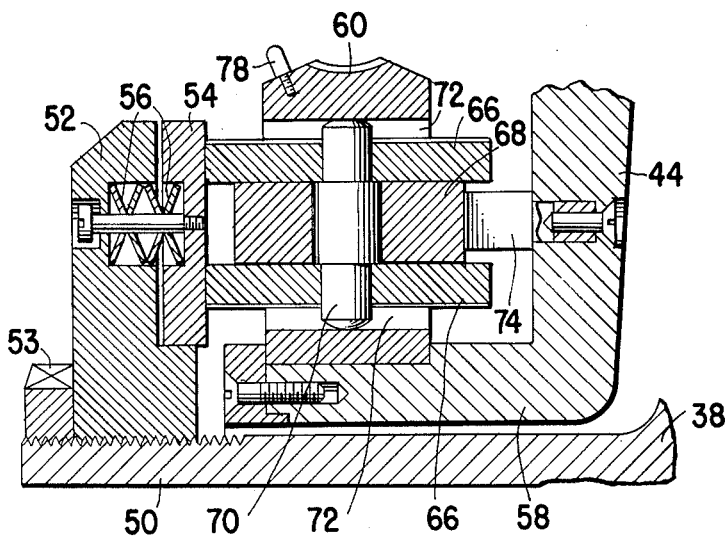

Objects and features of this invention will be appreciated from the following detailed description when said with reference to the accompanying drawings wherein:

FIG. 1 in an axial section of the motor with clutch and brake according to the invention showing the parts in shaft-driving position; and FIG. 2 is an enlarged view of the upper left hand portion of FIG. 1 showing the parts in shaft-locking position.

The motor shown is of the external rotor type. A stator A, with its windings, is keyed on a sleeve 10 fixed to and projecting from a plate 12. A rotor B is keyed through a ring B1 to the inside of a rim or flywheel C which is provided on its axis with a bush C1 internal and coaxial to said rim and also internal and coaxial to the stator A. A motor casing 14 also is fastened to the plate 12.

A shaft 16 extends through the bush C1 and it is supported at its ends by bearings 18 (fastened to the plate 12 through a ring nut 20) and 22 (fastened to a cap 24 on the case 14). The left hand end of the shaft 16 abuts a thrust bearing 26, retained by a small cap 28 and the right hand end of the shaft 16 (not shown) drives a machine tool. The shaft 16 between the bearings 18 and 22 is provided with other bearings 30 and 32 which support the rotor B-flywheel C assembly, the first of said bearings 30 and 32 being combined with a thrust bearing 34.

An annular gasket 36 is carried by the coupling end of the flywheel C and which is engageable by the face of a disc 38 that is torsionally connected to and axially slidable on a bush 40 keyed to the shaft 16. The other face of said disc 38 is engageable, through a gasket 42 with a rim 44 joined to the bottom of the casing 14.

The bush 40 ends with a flange 46 provided with seats to retain a set of coil springs 48 that cause the disc 38 to engage the end of the flywheel C when the parts are in shaft-driving position as shown in FIG. 1. The disc 38 is guided during its axial movement by a collar 50, the inner surface of which co-operates the periphery of the flange 46. A flange 52 is adjustably fixed to the collar 50 and supports on one of its faces a ring 54 that is urged away from the flange by means of flat springs 56 in seats provided in said flange 52 and ring 54.

The rim 44, secured to the casing 14, is provided at its inside opening with a tubular extension 58 constituting a bearing for a counter-disc 60 having peripheral teeth 62 marked with a pinion 64 which is operated by a servo-motor (not shown). The counter-disc 60 near, its periphery, is provided with openings each of which houses a pair of rollers 66 between which another roller 68 of smaller diameter than the other two is interposed.

These rollers are mounted on a single pivot pin 70 whose ends projecting from the pair of rollers 66 are so received in opening 72 that the roller set is slidable within the slot 72 in the counter-disc 60. The intermediate rollers 68 co-operate, as it will be described hereinafter, with beveled sectors or cams 74 fixed to the rim 44 along a circumference coaxial to the shaft 16. It is evident that with such a disposition when the engagement of the inclined planes 74 with the intermediate rollers 68 happens, the pair of rollers 66 engage with the flange 52 and the disc 38 is caused to move back in opposition to the springs 48, as shown in FIG. 2.

The counter-disc 60 is retained on the extension 58 by means of a ring 76 fixed to the end of said extension. The counter-disc 60 is provided at its periphery with projections 78 that form cams whose number is the same as the number of the inclined planes 74 and that operates a switch controlling the feeding of the servo-motor operatively connected to the pinion 64.

The disc 38 is normally engaged with the gasket 42 of the rim 44, that is, in braking position, since the rollers 68 normally engage with the inclined planes 74. The feed of the stator A then causes the rotor B to rotate together with the flywheel C, while the shaft 16 is stationary.

When the servo-motor actuating the counter-disc 60 is operated, the latter is rotated until the rollers 68 are disengaged from the inclined planes 74, whereupon the disc 38 under the action of the springs 48 is caused to engage with the gasket 36 of the flywheel C. In this way, the rotation of the flywheel C is transmitted, through the disc 38 and the bush 40 to the shaft 16.

When the servo-motor is operated again, the counter-disc 60 is rotated another increment to cause the rollers 68 to re-engage the inclined planes 74, and stop the shaft 16 again. The servo-motor runs until one of the projections 78 opens a switch 80 in the motor circuit, stopping the rollers 68 carried by the counter-disc 60 at the maximum height of the inclined planes 74. This produces a strong braking action on the operated part (not shown) connected to the shaft 16. The presence of the spring means 56 interposed between the ring 54 and the flange 52 produces a gradual braking action when the inclined planes 74 are steep. Such spring means also automatically take up slack caused by wear or other reasons and resiliently press the disc 38 against the gasket 42. When slack between the flange 52 and the rollers 66 is considerable and cannot be compensated by the action of the springs 56, it is taken up by screwing the flange 52 into the collar 50 and locking it in adjusted position by means of the counter-flange 53.

In summary, the clutch and brake mechanism includes a counter-disc 60 which is driven intermittently (stepwise) through the pinion 64 about the axis of the shaft 16 in order to provide a driving connection from the motor to the shaft 16 or to uncouple such driving connection and lock the shaft 16. The counter-disc 60 carries a plurality of roller sets (axially translatable relative to the counter-disc) each including a pair of equal diameter rollers 66 separated by a roller 68 of lesser diameter than the diameters of the rollers 66, which intermediate rollers 68 are engagable upon rotation of the counter-disc 60 with stationary inclined planes 74 fixed to the rim 44 along a circumference coaxial with the shaft 16. There is an inclined plane 74 for each of the rollers 68 and when one of the inclined planes 74 engages a roller 68 all of the inclined planes 74 engage their respective rollers 68, the inclined planes 74 being equally spaced apart.

FIG. 1 shows the working parts in shaft-driving position, wherein the counter-disc 60 has been rotated to a position such that the rollers 68 are disengaged from the inclined planes 74 and the springs 48 urge the disc 38 against the gasket 36 of the flywheel C. Rotation of the flywheel C then is transmitted through the disc 38 and the bush 40 to the shaft 16.

FIG. 2 shows the working parts in shaft-locking position, wherein the counter-disc 60 has been rotated to a position such that the rollers 68 are engaged with the inclined planes 74 which cam the disc 38, through the rollers, against the gasket 42 of the stationary rim 44 in opposition to the springs 48. The feed of the stator A then causes the rotor B to rotate together with the flywheel C while the shaft 16 is locked.

Accordingly, stepping of the counter-disc 60 about the axis of the shaft 16 causes successive engagement and release between the motor and the driven part of the machine tool, one step of the counter-disc 60 into its FIG. 1 position permitting the springs 48 automatically to shift the disc 38 against the gasket 36 of the flywheel C (shaft 16 driven), the next step of the counter-disc 60 into its FIG. 2 position driving the rollers 68 automatically against the cams 74 and thus the disc 38 in opposition to the springs 48 against the gasket 42 of the stationary 44 (shaft 16 locked), etc.

It is evident that the described and explained motor with clutch and brake may undergo modifications and changes in dependence on the requirements and the features of employment, for example, the flywheel C can be provided with transmission members such as crown gears, sheaves and the like.

It is to be understood that the above description is illustrative of this invention and that various modifications thereof can be utilized without departing from its spirit and scope.

I claim:

1. A clutch and brake for a motor having a rotatably mounted rotor and an output shaft comprising in combination, a rotatable member mounted to rotate together as one with the rotor, a stationary member, a disc located between said members and torsionally connected to and axially slidable on said output shaft, and means advanceable stepwisely in a given direction for alternately shifting the disc into engagement with the respective members, whereby engagement of the disc with the rotatable member operatively connects the rotor to the shaft and engagement of the disc with the stationary member disconnects the rotor from the shaft and locks the shaft.

2. A clutch and brake for a motor according to claim 1 wherein said means includes resilient means for urging the disc into engagement with the rotatable member and cam means for driving the disc in opposition to the resilient means into engagement with the stationary member.

3. A clutch and brake for a motor having a rotatably mounted rotor and an output shaft comprising, in combination, a rotatable member mounted to rotate together as one with the rotor, a stationary member, a disc located between said members and torsionally connected to and axially slidable on said output shaft, and means advanceable stepwisely in a given direction for alternately shifting the disc into engagement with the respective members, said means including resilient means for urging the disc into engagement with the rotatable member, a counter-disc rotatably mounted co-axially with the shaft and carrying a plurality of roller sets in engagement with the disc, and stationarily mounted cams, one for each roller set, arranged peripherally relative to the counter-disc and engageable with a roller of each roller set upon rotation of the counter-disc to drive the roller sets and thus the roller-engaged disc in opposition to the resilient means into engagement with the stationary member.

4. A clutch and brake for a motor according to claim 3 wherein the disc carries a flange which is engaged by the roller sets, which flange is connected to the disc by adjusting means for varying the spaced relationship between the flange and the cams.

5. A clutch and brake for a motor according to claim 3 wherein each roller set includes two equal-diameter rollers separated by a roller of smaller diameter which is cooperatable with the cams, the three rollers being mounted on a single slidably-mounted pivot pin, whereby each set of rollers can axially translate relative to the counter-disc.

6. A clutch and brake for a motor according to claim 4 wherein the flange is provided with a ring that engages the roller sets and resilient means are interposed between the flange and the ring.

7. A clutch and brake for a motor having a rotatably mounted rotor and output shaft comprising, in combination, a rotatable member mounted to rotate together as one with the rotor, a stationary member, a disc torsionally connected to and axially movable relative to the shaft between the members, a counter-disc rotatably mounted coaxially with the shaft, roller means carried by and axially translatable relative to the counter-disc in engagement with the disc, resilient means urging the disc into engagement the rotatable member, and spaced-apart inclined plane means stationarily mounted and engageable by the roller means upon stepwise rotation of the counter-disc for driving the disc in opposition to the resilient means into engagement with the stationary member, engagement of the disc with the rotatable member operatively connecting the rotor to the shaft and engagement of the disc with the stationary member disconnecting the rotor from the shaft and locking the shaft.

8. A clutch and brake for a motor according to claim 7 wherein gear means are provided to impart stepwise rotation to the counter-disc to effect a cycle comprising engagement of the clutch followed by disengagement of the clutch and operation of the brake.

9. A clutch and brake for a motor according to claim 7 wherein the roller means includes a plurality of roller sets each including two equal-diameter rollers separated by a roller of lesser diameter which is cooperatable with the inclined plane means, the three rollers being mounted on a single slidably-mounted pivot pin.

References Cited by the Examiner
UNITED STATES PATENTS

| 2,481,867 | 9/49 | Peterson | 310—76 |
| 2,646,519 | 7/53 | Kalikow et al. | 310—76 |
| 2,659,830 | 11/53 | Mason et al. | 310—76 |
| 2,680,504 | 6/54 | Schweda. | |
| 2,721,279 | 10/55 | Wendel | 310—76 |
| 2,809,308 | 10/57 | Turner | 310—76 |

ORIS L. RADER, *Primary Examiner.*

MILTON O. HIRSHFIELD, *Examiner.*